(12) United States Patent
Leyden et al.

(10) Patent No.: US 8,692,672 B2
(45) Date of Patent: Apr. 8, 2014

(54) INTEGRATED CHARGER AND ALARM UNIT

(71) Applicant: Se-Kure Controls, Inc., Franklin Park, IL (US)

(72) Inventors: Roger J. Leyden, Inverness, IL (US); David M. Adams, Bensenville, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 0 days.

(21) Appl. No.: 13/890,479

(22) Filed: May 9, 2013

(65) Prior Publication Data

US 2014/0035539 A1   Feb. 6, 2014

Related U.S. Application Data

(63) Continuation of application No. 13/566,339, filed on Aug. 3, 2012.

(51) Int. Cl.
*G08B 13/14* (2006.01)

(52) U.S. Cl.
USPC .................................. 340/568.1; 340/586.3

(58) Field of Classification Search
USPC .......... 340/568.1, 586.3, 568.4; 600/117, 118
See application file for complete search history.

(56) References Cited

U.S. PATENT DOCUMENTS

| | | | |
|---|---|---|---|
| 5,172,098 A | 12/1992 | Leyden et al. | |
| 5,552,771 A | 9/1996 | Leyden et al. | |
| 6,678,183 B2 | 1/2004 | Creger et al. | |
| 2010/0188222 A1* | 7/2010 | Irmscher et al. | 340/568.2 |

* cited by examiner

*Primary Examiner* — Shirley Lu
(74) *Attorney, Agent, or Firm* — Wood, Phillips, Katz, Clark & Mortimer

(57) ABSTRACT

An integrated charger and alarm unit. A plurality of alarm receptacles are in a housing, each for selectively receiving a sensor cord for sensing security status of one of a plurality of chargeable devices. A plurality of charging receptacles are in the housing, one for each alarm receptacle, each for selectively receiving a power cord for charging one of the chargeable devices. A power receptacle in the housing connects to an electrical power source. An electrical circuit is operatively connected to the alarm receptacles, the charging receptacles and the power receptacle. The electrical circuit comprises an alarm control powered by the electrical power source and connected to the alarm receptacles and generating an alarm signal if the security status of any of the plurality of chargeable devices is in an unsecured status. A power supply control regulates power from the electrical power source to each of the charging receptacles.

19 Claims, 6 Drawing Sheets

INTEGRATED CHARGER AND ALARM UNIT

CROSS-REFERENCE TO RELATED APPLICATIONS

This application is a continuation of application Ser. No. 13/566,339, filed Aug. 3, 2012.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to security alarms and charging units and, more particularly, to an integrated charger and alarm unit.

BACKGROUND

Retail and wholesale merchandisers direct substantial attention to the nagging and costly problem associated with the theft and/or damage of costly display products on their premises. With the predominance of smaller and portable electronic apparatus, the ease with which pilferers and shoplifters can quickly and easily remove such goods from display cases and display racks has intensified. At the same time, the availability of such products has skyrocketed, resulting in more and more valuable products being taken or tampered with. As locks and other security devices have become more sophisticated, so too have the individuals and methods for circumventing the operation of conventional security devices and, particularly, alarm sensing devices. The alarm system described in U.S. Pat. No. 5,172,098, to Leyden, has solved many of these problems.

Moreover, many such electronic devices are battery powered and require that the devices be periodically charged. Ideally, the consumer will see the device in operation requiring that it maintain an ample charge. Providing independent charging units for each such device, as well as providing charging devices in addition to the security systems, presents difficulties with respect to multiple cords, power adaptors, power receptacles, and the like. The ability to simultaneously charge the device while maintaining protection of an alarm system is preferable.

SUMMARY

In accordance with the invention, the above desires are satisfied using an integrated charger and alarm unit.

In accordance with one aspect of the invention there is disclosed an integrated charger and alarm unit comprising a housing. A plurality of alarm receptacles are in the housing, each for selectively receiving a sensor cord for sensing security status of one of a plurality of chargeable devices. A plurality of charging receptacles are in the housing, one for each alarm receptacle, each for selectively receiving a power cord for charging one of the chargeable devices. A power receptacle in the housing connects to an electrical power source. An electrical circuit is operatively connected to the alarm receptacles, the charging receptacles and the power receptacle. The electrical circuit comprises an alarm control powered by the electrical power source and connected to the alarm receptacles and generating an alarm signal if the security status of any of the plurality of chargeable devices is in an unsecured status. A power supply control regulates power from the electrical power source to each of the charging receptacles.

There is disclosed in accordance with another aspect of the invention an integrated charger and alarm unit comprising a housing. Pluralities of paired receptacles are in the housing. Each pair comprises an alarm receptacle and a charging receptacle. Each alarm receptacle selectively receives a sensor cord for sensing security status of one of a plurality of chargeable devices. Each charging receptacle is for selectively receiving a power cord for charging the one of the plurality of chargeable devices. A power receptacle in the housing connects to an electrical power source. An electrical circuit is operatively connected to the alarm receptacles, the charging receptacles and the power receptacle. The electrical circuit comprises an alarm control powered by the electrical power source and connected to the alarm receptacles and generating alarm signal if the security status of any of the plurality of chargeable devices is in an unsecured state. A power supply control regulates power from the electrical power source to each of the charging receptacles.

It is a feature of the invention to provide six alarm receptacles and six charging receptacles or twelve alarm receptacles and twelve charging receptacles.

It is another feature of the invention that the charging receptacles comprise USB type connectors.

It is a further feature of the invention that the power supply control provides about 2.1 amps at each charging receptacle.

It is yet another feature that the alarm control comprises a programmed microcontroller and a matrix circuit connecting the microcontroller to the alarm receptacles.

It is another feature of the invention to provide a battery backup circuit for selectively powering the alarm control.

It is an additional feature of the invention that the power supply control comprises a dual synchronous buck controller having two output channels each driving a gate circuit and the gate circuit outputs are connected to provide a single output.

It is an additional feature that the electrical circuit comprises two power supply controls regulating power from the electrical power source to the charging receptacles and each of the power supply controls power six charging receptacles.

It is yet another feature of the invention that the power control protects each charging receptacle from over current and short circuit conditions.

Other features and advantages will be apparent from a review of the entire specification, including the appended claims and drawings.

DETAILED DESCRIPTION

The disclosed integrated charger and alarm unit is shown used with a chargeable electronic device. The unit can be used with a wide variety of products. It is understood that the particular product used to illustrate the invention is shown by way of example only and not as a limitation of the invention.

Figure 1:
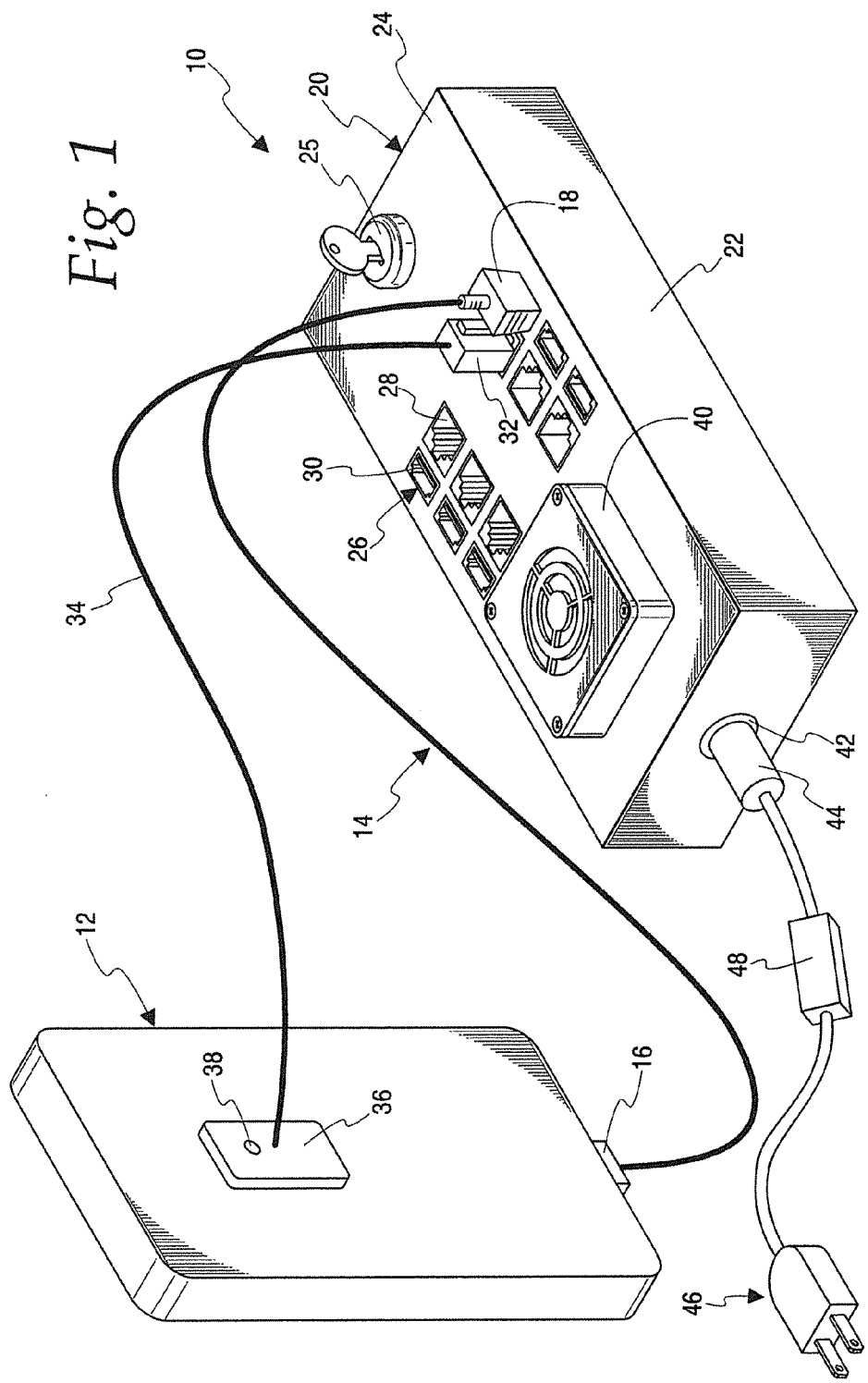
FIG. 1 is a perspective view of an integrated charger and alarm unit for use with six chargeable devices.

Referring initially to FIG. 1, an integrated charger and alarm unit 10 is shown for use at a point of purchase display for a chargeable portable electronic device 12. The device 12 may be of any design and includes a rechargeable battery. Many of such phones, as currently designed, utilize a USB type cable 14 including opposite plugs 16 and 18. One of the plugs 16 is selectively mated with a corresponding receptacle in the device 12. The other plug 18 is conventionally used by plugging it in to a USB type port of a computer or a USB type port in a power adaptor for connecting to a conventional 120 volt AC power source.

In accordance with the invention, the integrated charger and alarm unit is adapted to provide power to selectively charge the device 12 and at the same time to monitor security status of the device 12.

The integrated charger and alarm unit 10 comprises a housing 20 of parallelepiped construction including a base 22 and removable cover 24. A lock 25 selectively secures the cover 24 to the base 22 in any known manner and also arms the unit 10. The housing 20 supports six receptacle pairs 26, one of which is labelled, each comprising an alarm receptacle 28 and a charging receptacle 30. The alarm receptacle 28 comprises an RJ11 receptacle. The charging receptacle 30 comprises a USB type receptacle. As will be apparent, other types of receptacles can be used depending on the cables with which they are used. The charging receptacle 30 is adapted to receive the USB type plug connector 18, while the alarm receptacle 28 is adapted to receive a conventional RJ11 plug connector 32.

Each alarm receptacle 28 is adapted to selectively receive a sensor cord 34 operatively connected to the plug 32. The opposite end of the cord 34 is connected to a sensor 36. The sensor 36 is of conventional construction and the sensor may be as illustrated in U.S. Pat. No. 5,552,771, to Leyden et al., the specification of which is hereby incorporated by reference herein. The sensor 36 includes an electrical contact (not shown) which completes an electrical circuit when the sensor 36 is attached to the device 12, or other device. The sensor 36 may include an integrated LED 38 to indicate alarm status.

The housing 20 also include a cooling fan 40. A power receptacle 42 in the housing is adapted to receive a locking connector 44. The locking connector 44 receives DC power from an AC/DC adapter 48 which is in turn connected to a plug 46 for connection to an electrical power source.

Figure 2:
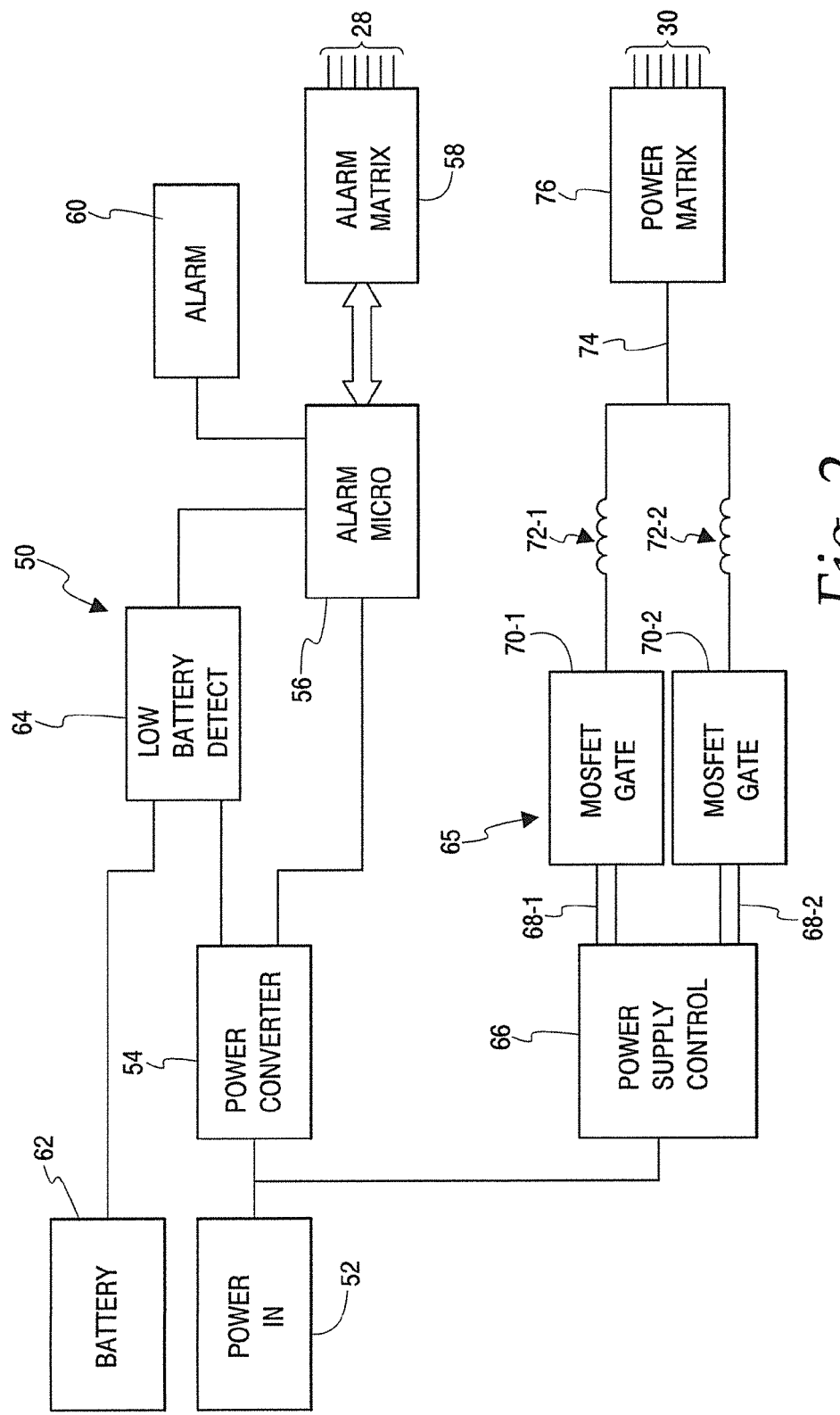
FIG. 2 is a block diagram of an electrical circuit for the unit of FIG. 1.

Referring to FIG. 2, an electrical circuit 50 in the housing 20 is illustrated in block diagram form. The circuit 50 includes a power in block 52 adapted to receive DC power from the power adapter 48. A power converter block 54 is connected to the power in block 52 and converts input power from 12 volts to 9 volts DC. The power converter block 54 may include, for example, an LM34919B buck converter.

The power converter block 54 is electrically connected to an alarm microcontroller block 56. The alarm microcontroller block 56 comprises a programmed microcontroller adapted to sense the status of sensors 36. The alarm microcontroller block 56 and its associated programming may take any known form. The alarm microcontroller 56 is connected to an alarm matrix block 58 which is in turn electrically connected to the six alarm receptacles 28. The alarm matrix block 58 minimizes line connections to the microcontroller block 56 and allows use of fewer I/O lines. The matrix block 58 monitors status of the electrical contacts in the sensors 36 and selectively controls the LEDs 38 in a conventional manner.

The alarm microcontroller block 56 is also connected to an alarm block 60 for generating an audio signal responsive to sensed alarm conditions. A battery block 62, comprising six 1.5 Volt batteries, is selectively connected to a low battery detect block 64. The low battery detect block 64 is connected to the power converter 54 and the alarm microcontroller block 56. The battery 62 provides battery backup for the alarm microcontroller block 56 in the event that AC power is lost. The low battery detect block 64 provides a signal under low battery conditions.

The electrical circuit 50 further comprises a charging circuit 65 including a power supply control block 66 having dual output channels 68-1 and 68-2 each connected to a respective MOSFET gate block 70-1 and 70-2. The outputs of the MOSFET gate blocks 70-1 and 70-2 are connected via inductors 72-1 and 72-2, respectively, to a junction 74 to provide a single output to a power matrix block 76. The power matrix block 76 provides power and overcurrent protection to the charging receptacles 30.

Figure 3:
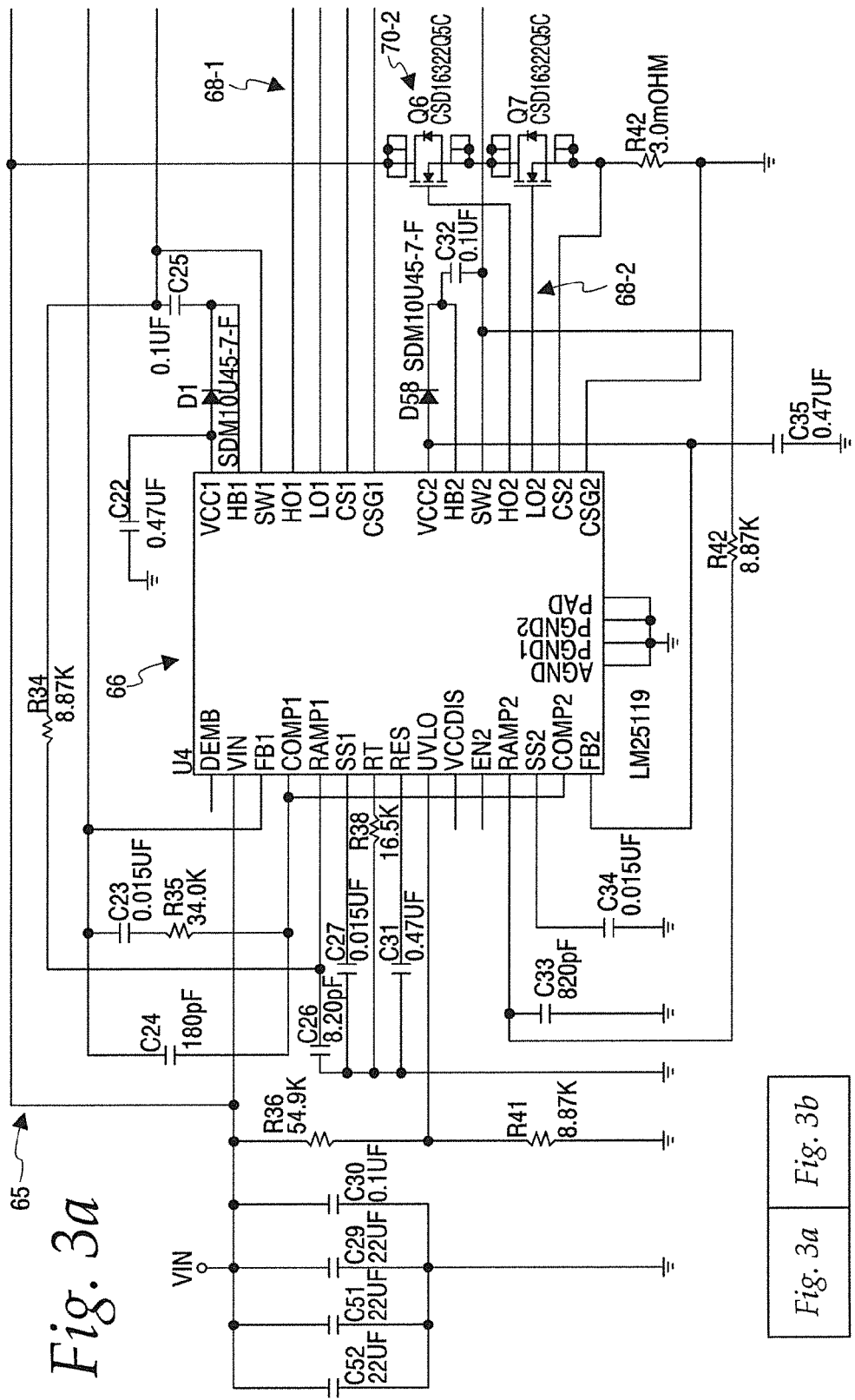
FIGS. 3a and b are an electrical schematic for the power supply control of FIG. 2.

Referring to FIGS. 3a and 3b, an electrical schematic is illustrated for the charging circuit 65. The power supply control 66 includes a controller chip U4 such as an LM25119 wide input range dual synchronous buck controller. The controller U4 includes the first output channel 68-1 at terminals H01 and L01 and the second output channel 68-2 at terminals H02 and L02. The first MOSFET gate circuit 70-1 includes MOSFET gates Q4 and Q5. The second MOSFET gate circuit 70-2 consists of MOSFET gates Q6 and Q7. The single output at the node 74 is labelled at 5 Volts DC. The controller U4 is adapted for interleaved operation in which output power is split between two identical channels to reduce current in each channel by half. The power control circuit is adapted to provide 2.1 amps available at each of the charging receptacles 26.

Figure 4:
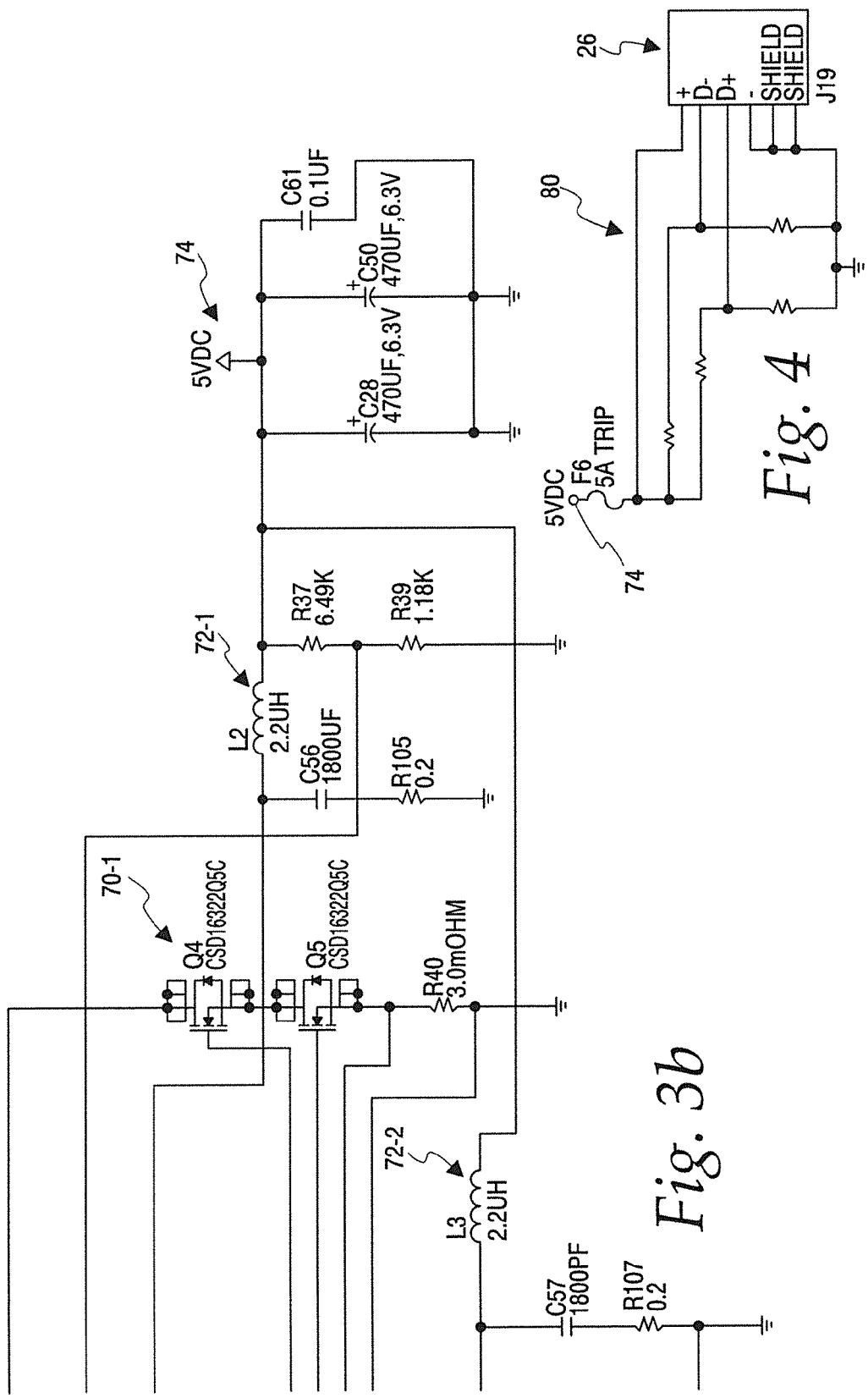
FIG. 4 is an electrical schematic of the charging receptacle circuits for the unit of FIG. 1.

Referring to FIG. 4, the power matrix 76 comprises six identical USB type interface circuits 80 (one of which is shown). Each circuit 80 is powered by 5 Volts DC from the node 74. The circuit 80 is a typical USB type connector circuit to provide 2.1 amps available at each charging connector 30. The power control circuit 66 protects each charging receptacle 30 from overcurrent and short circuit conditions.

In use, the integrated charger and alarm unit 10 can simultaneously monitor security status of up to six devices 12, while simultaneously charging all six devices 12 using power from the single power adaptor 48. If the sensor 36 is removed from the device 12, then the alarm microcontroller 56 will sense the unsecured status of the sensor 36 and generate an alarm such as an audio alarm to the alarm device 60 and/or by illuminating the LED 38. At the same time, the charging power is provided to the device 12 via the USB type cable 14 to charge the battery of the device 12 in a conventional manner.

Figure 5:
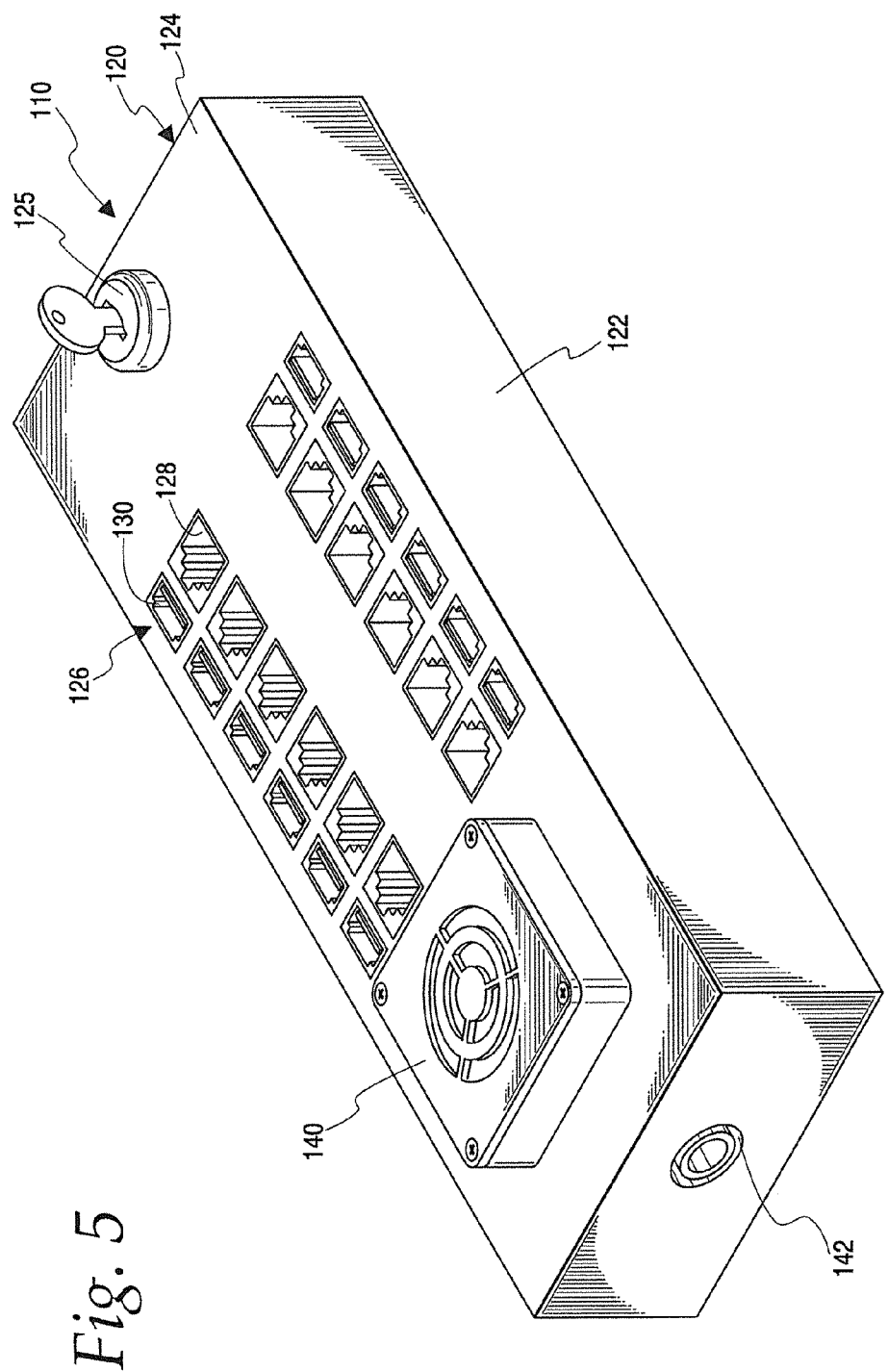
FIG. 5 is a perspective view of an integrated charger and alarm unit for use with twelve chargeable devices.

Referring to FIG. 5, an alternative integrated charger and alarm unit 110 is illustrated. The charging unit 110 differs from the unit 10 in that it is adapted to include twelve pairs 126 of alarm receptacles 128 and charging receptacles 130. For simplicity, the unit 110 is illustrated using similar reference numerals to the unit 10, except being in the 100 series. Common aspects of the units are not described in detail herein.

Figure 6:
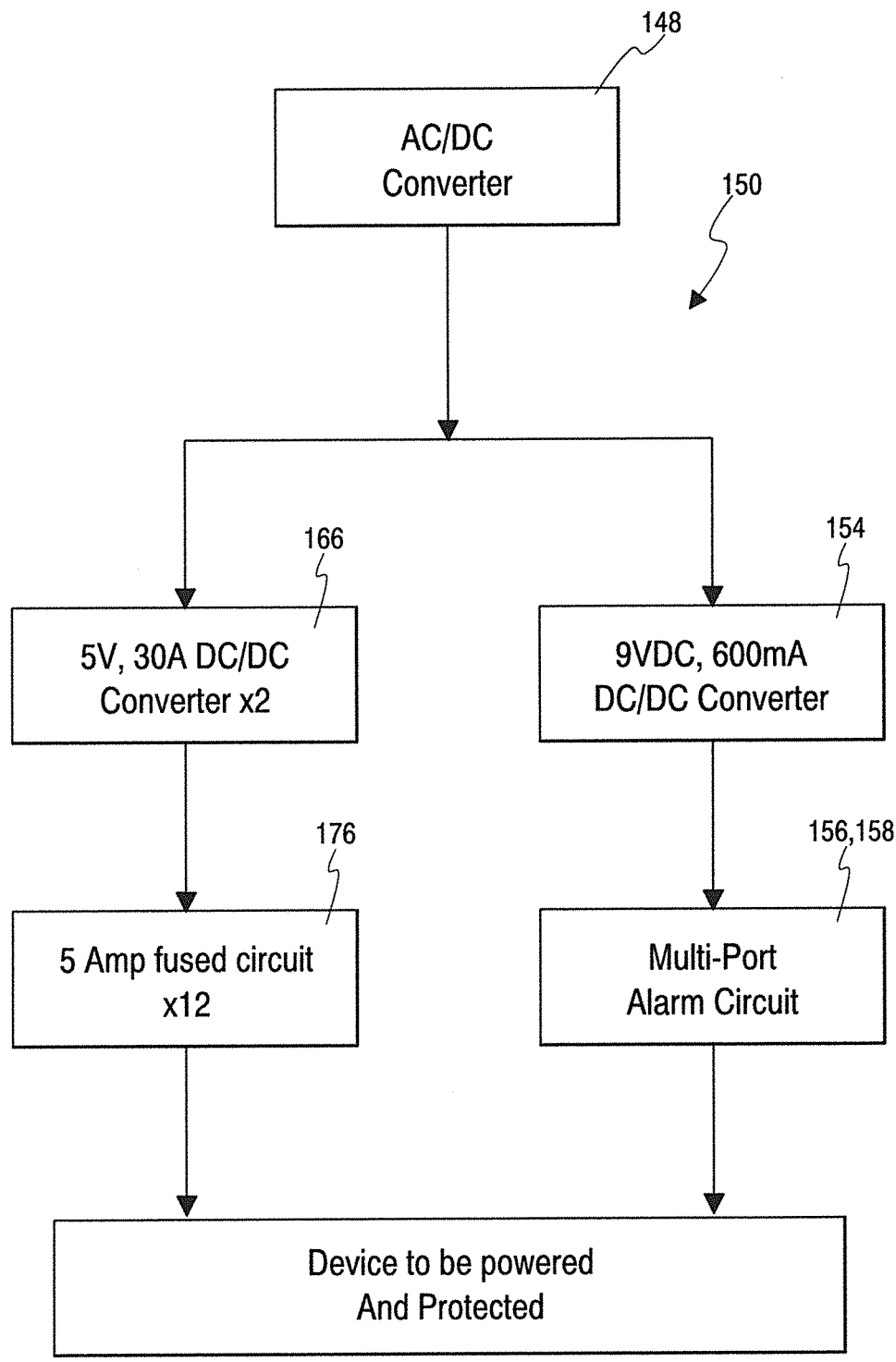
FIG. 6 is a block diagram of an electrical circuit for the unit of FIG. 5.

Referring to FIG. 6, a simplified block diagram of an electrical circuit 150 for the unit 110 is illustrated. Power is received via an AC/DC converter 148 in the form of a conventional power adaptor. The circuit includes the alarm channel consisting of the power converter circuit 154 and the multi-port alarm circuit including an alarm microcontroller 156 and alarm matrix 158. As is apparent, the alarm matrix 158 is adapted for connection to twelve sensors. On the power side, the circuit includes two power supply control circuits 166 and the power matrix circuit 176 for twelve charging receptacles 130. Particularly, the power supply control 166 includes two of the charging circuits 65 illustrated in FIGS. 3*a* and 3*b*, each for powering six charging receptacles. The charging and alarm unit 110 is otherwise similar to the charging and alarm unit 10, discussed above, although being shown in less detail.

The integrated charger and alarm units 10 and 110 described herein are shown for use with either six or twelve electronic devices in the form of smart phones 12, or the like. As is apparent, a different number of devices could be monitored and charged, as will be apparent.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A method of charging and monitoring a plurality of chargeable electrical devices, comprising:
   providing a housing including a plurality of receptacles connected to a control, the control comprising an alarm control and a power supply control regulating power from an electrical power source to the plurality of receptacles;
   selectively connecting one or more chargeable electrical devices to select ones of the plurality of receptacles;
   the power control charging the chargeable electrical devices connected to the plurality of receptacles; and
   the alarm control monitoring security status of the chargeable electrical devices and generating an alarm signal if any of the plurality of chargeable electrical devices becomes disconnected from the plurality of receptacles;
   wherein selectively connecting a chargeable electrical device comprises providing a cord having a first apparatus at one end and a second apparatus at an opposite end, the first apparatus being connected to the receptacle and the second apparatus being connected to the chargeable electrical device and the alarm control monitors an electrical signal between the first and the second apparatus.

2. The method of claim 1 comprising six receptacles.

3. The method of claim 1 comprising twelve receptacles.

4. The method of claim 1 wherein the receptacles comprise USB type connectors.

5. The method of claim 1 wherein selectively connecting a chargeable electrical device comprises providing a sensor securable to the chargeable electrical device.

6. The method of claim 1 wherein selectively connecting a chargeable electrical device comprises providing electrical conductors connected between the receptacles and the chargeable electrical device and the alarm control monitors an electrical signal carried by the conductors.

7. The method of claim 1 wherein the first apparatus comprises a plug.

8. The method of claim 1 wherein the second apparatus comprises a sensor.

9. The method of claim 1 wherein the power control protects each receptacle from over current and short circuit conditions.

10. An integrated method of charging and monitoring a plurality of chargeable electrical devices, comprising:
    providing a housing including a plurality of receptacles;
    providing an alarm control in the housing connected to the plurality of receptacles;
    providing a power supply control in the housing connected to the plurality of receptacles for regulating power from an electrical power source to the plurality of receptacles;
    connecting a plurality of chargeable electrical devices to the plurality of receptacles;
    the power control charging the chargeable electrical devices connected to the plurality of receptacles; and
    the alarm control monitoring security status of the chargeable electrical devices and generating an alarm signal if any of the plurality of chargeable electrical devices becomes disconnected from the plurality of receptacles;
    wherein selectively connecting a chargeable electrical device comprises providing a cord having a first apparatus at one end and a second apparatus at an opposite end, the first apparatus being connected to the receptacle and the second apparatus being connected to the chargeable electrical device and the alarm control monitors an electrical signal between the first and the second apparatus.

11. The method of claim 10 comprising six receptacles.

12. The method of claim 10 comprising twelve receptacles.

13. The method of claim 10 wherein the receptacles comprise USB type connectors.

14. The method of claim 10 wherein connecting a plurality of chargeable electrical devices to the plurality of receptacles comprises providing a plurality of sensors each securable to one of the chargeable electrical devices.

15. The method of claim 10 wherein connecting a plurality of chargeable electrical devices to the plurality of receptacles comprises providing electrical conductors connected between the receptacles and the chargeable electrical devices and the alarm control monitors an electrical signal carried by the conductors.

16. The method of claim 10 wherein connecting a plurality of chargeable electrical devices to the plurality of receptacles comprises providing a plurality of cords each having a first apparatus at one end and a second apparatus at an opposite end, the first apparatus being connected to the receptacles and the second apparatus being connected to one of the chargeable electrical devices and the alarm control monitors electrical signals of the plurality of cords between the first and the second apparatus.

17. The method of claim 16 wherein each first apparatus comprises a plug.

18. The method of claim 16 wherein each second apparatus comprises a sensor.

19. The method of claim 10 wherein the power control protects each receptacle from over current and short circuit conditions.

* * * * *